United States Patent [19]
Chu

[11] Patent Number: 5,667,515
[45] Date of Patent: Sep. 16, 1997

[54] RELEASABLE EARMARK ASSEMBLY

[76] Inventor: Chun-Ta Chu, No. 38, Nung 155, Lane 482, Sec. 2, Ta Tung Road, Tainan, Taiwan

[21] Appl. No.: 425,486

[22] Filed: Apr. 20, 1995

[51] Int. Cl.$^6$ ........................................................ G09F 3/00
[52] U.S. Cl. ................... 606/116; 606/117; 40/300; 40/301
[58] Field of Search ........................ 606/116, 117; 40/300, 301; 411/303, 302, 339, 338, 525, 526

[56] References Cited

U.S. PATENT DOCUMENTS

| | | | |
|---|---|---|---|
| 3,040,796 | 6/1962 | Gouverneur, II | 411/303 |
| 3,389,439 | 6/1968 | Papazian | 411/525 |
| 3,988,796 | 11/1976 | Schmidt | 10/86 B |
| 4,021,952 | 5/1977 | Brierley | 40/301 |
| 4,209,924 | 7/1980 | Fearing | 40/301 |
| 4,581,834 | 4/1986 | Zatkos et al. | 40/301 |
| 4,646,455 | 3/1987 | Gardner | 40/301 |
| 4,694,781 | 9/1987 | Howe et al. | 606/117 |
| 4,747,738 | 5/1988 | Duran | 411/353 |

FOREIGN PATENT DOCUMENTS

| | | | |
|---|---|---|---|
| 99908 | 9/1964 | Denmark | 40/300 |
| 47697 | 3/1982 | European Pat. Off. | 40/301 |
| 11291 | of 1889 | United Kingdom | 40/301 |
| 1053454 | 3/1965 | United Kingdom | 40/301 |

*Primary Examiner*—Robert A. Hafer
*Assistant Examiner*—Benjamin K. Koo
*Attorney, Agent, or Firm*—Morton J. Rosenberg; David I. Klein

[57] ABSTRACT

An earmark assembly is provided which includes a pair of earmark tags of the same shape and size, each tag having an annular protuberance formed on an outer surface thereof. The annular protuberance of each tag is disposed in concentric relationship with a through opening formed therein. The assembly further includes a fastening member which is releasably coupled to the pair of earmark tags through their respective through openings. The fastening member includes a distal end disposed within a recessed area formed by the annular protuberance of one of the earmark tags. The assembly further includes a locking device releasably coupled to the distal end of the fastening member and disposed within the recessed area of the protuberance.

2 Claims, 5 Drawing Sheets

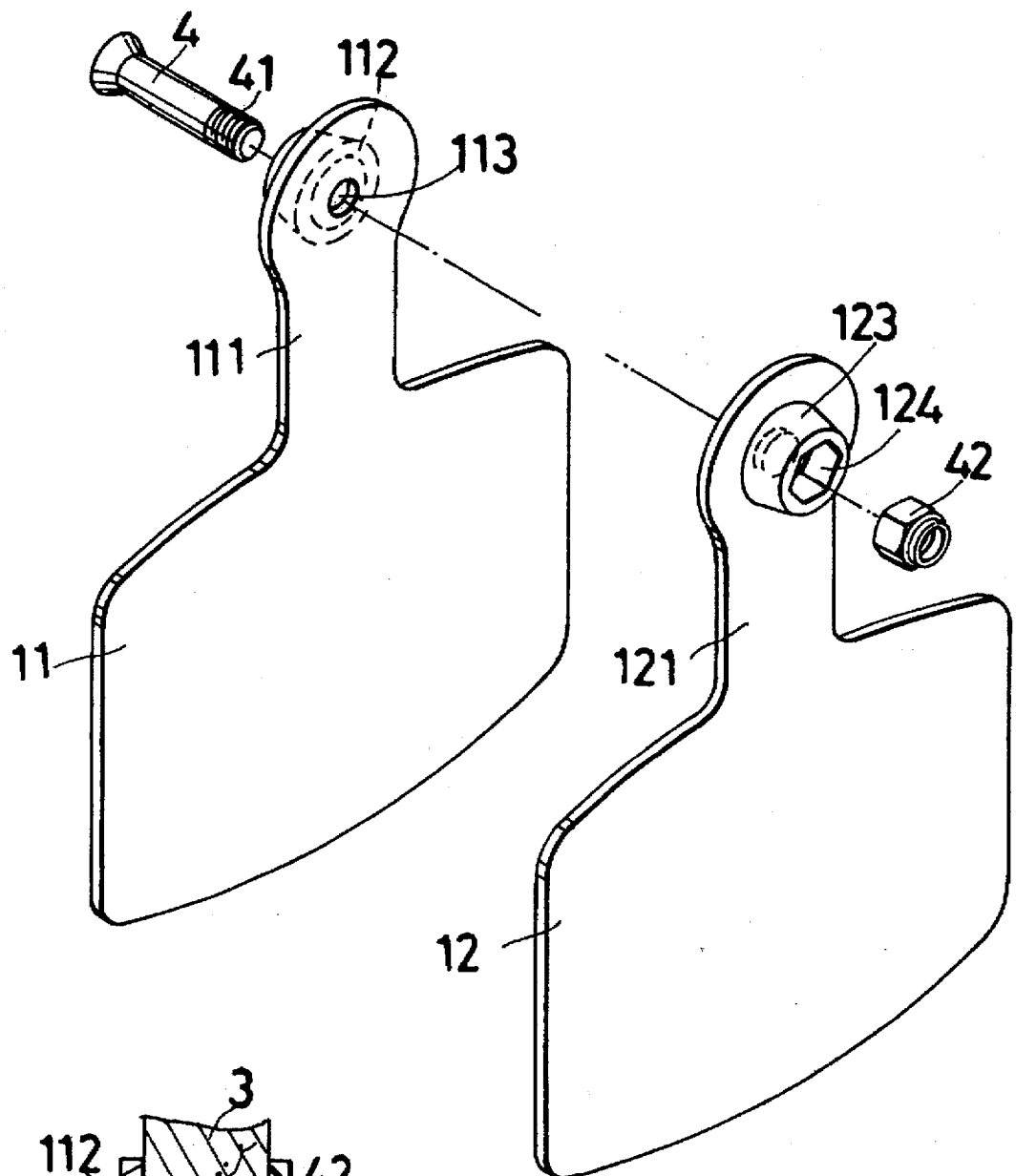
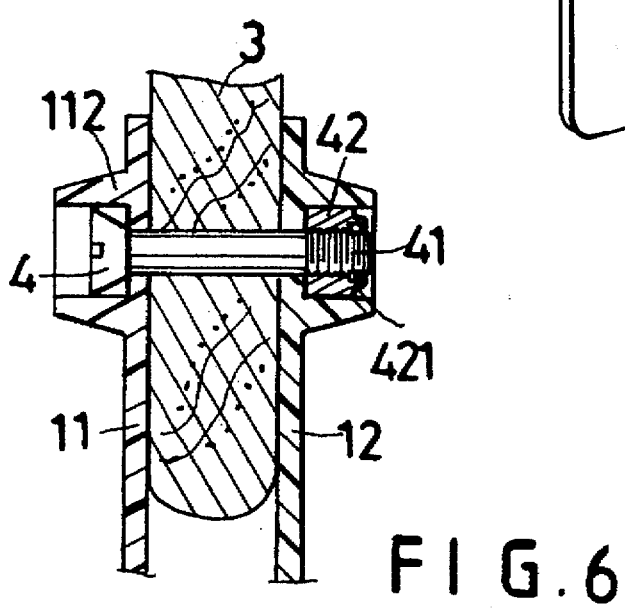
FIG.5
FIG.6

RELEASABLE EARMARK ASSEMBLY

BACKGROUND OF THE INVENTION

This invention concerns an earmark particularly one that may be conveniently removed and replaced from the ear of an animal and which is low in cost.

Generally speaking, a large ranch grows a great number of cattle and sheep which normally graze in the pasture during the daytime and which must be herded back to their stable in the nighttime. And each one of the cattle or sheep is tagged with an earmark on its ear so that all the cattle or sheep may be identified.

A known conventional earmark shown in FIG. 9 includes a plastic earmark body 10, which has an upper portion 20 with a hole for a nail 40 to fix the earmark body 10 on an ear of an animal, and a code number 30 printed on one side of the body 10.

However, animals have a habit of rubbing their ears against something or of biting at one another's ears. Then the code number on the earmark may gradually be worn away over a period of use, but the earmark can hardly be conveniently removed for replacement with another.

SUMMARY OF THE INVENTION

This invention has been devised to offer a kind of earmark having a left earmark and a right earmark fixed on an ear of an animal by means of a pin having an annular groove inserted through them and an ear of an animal and then being releasably locked by a lock washer or a tooth lock washer which engages the annular groove so as to secure the earmark on the ear of the animal.

Another object of this invention is to offer a kind of earmark which may very simply be attached to an ear of an animal, its components being conveniently replaceable.

BRIEF DESCRIPTION OF THE DRAWINGS

The invention will be better understood by reference to the accompanying Drawings, wherein:

FIG. 5 is an exploded perspective view of a third embodiment of the earmark in the present invention;

FIG. 6 is a side cross-sectional view of the third embodiment of the earmark in the present invention;

DESCRIPTION OF THE PREFERRED EMBODIMENTS

Figure 1:
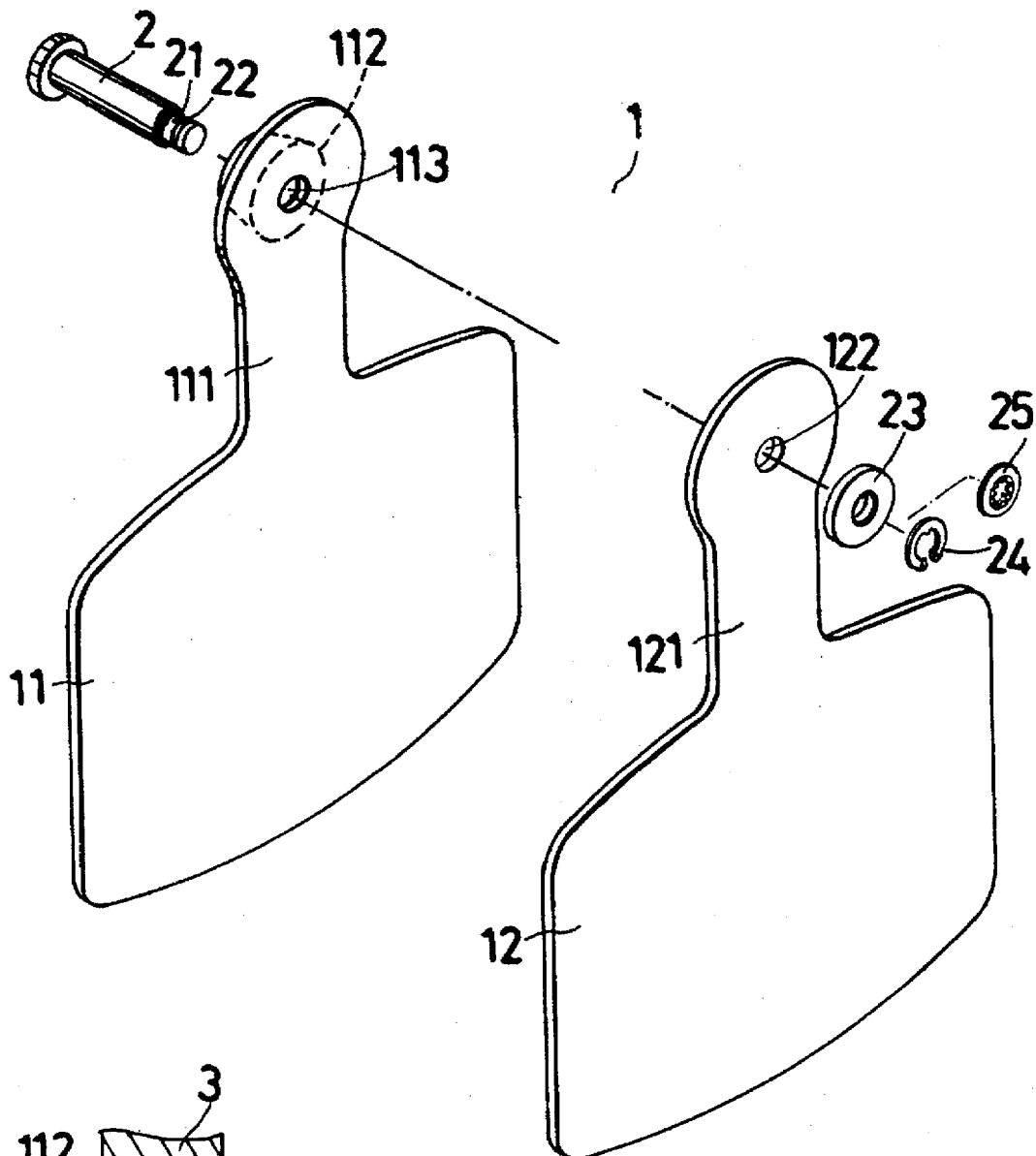
FIG. 1 is an exploded perspective view of a first embodiment of an earmark in the present invention.

A first embodiment of an earmark in the present invention, as shown in FIG. 1, includes an earmark 1 and a pin 2 combined together.

The earmark 1 consists of a left earmark 11 and a right earmark 12 fixed together. The left earmark 11 has an upper nearly rectangular portion 111 with a semicircular top edge. The upper portion 111 has an annular protuberance 112 with a center pin hole 113 on an outer side. The right earmark 12 has the same shape and size as the left earmark 11, with an upper nearly rectangular portion 121 with a pin hole 122 in a corresponding location of the hole 113 of the left earmark 11, but having no annular protuberance as in the left earmark 11.

The pin 2 has a lower fitting section 21 of a smaller diameter than the rest, and an annular groove 22 in the lower section 21.

Figure 2:
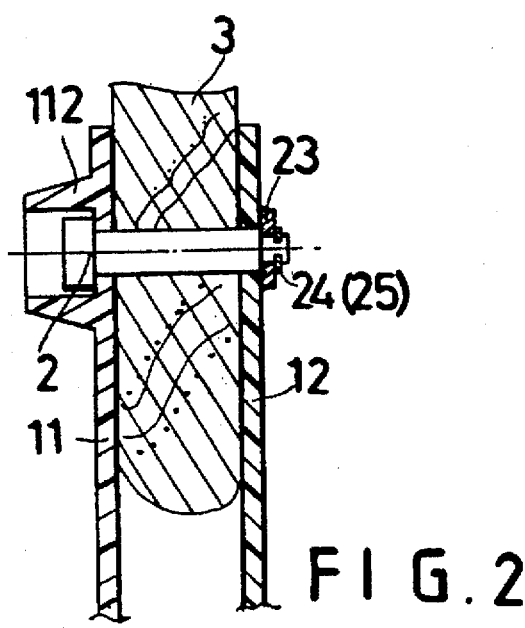
FIG. 2 is a side cross-sectional view of the first embodiment of the earmark in the present invention.

Referring to FIG. 2, the earmark tag assembly is assembled as follows: at first, an ear 3 of an animal is to be punched with a hole of a little bigger diameter than that of the pin 2, and then the pin 2 is to be inserted through the hole 113 of the left earmark 11, the hole of the animal ear 3 and through the hole 122 of the right earmark 12. Finally, a washer 23 is fitted around the lower fitting section 21 of the pin 2, and then a lock washer 24 or a tooth lock washer 25 is made to engage the annular groove 22 of the pin 2. Thus, the earmark 1 in the present invention is fixed securely on the ear 3 of the animal.

The lock washer 24 engaging the annular groove of the pin 2 can be substituted by a tooth lock washer 25 shown in FIG. 1.

Figure 7:
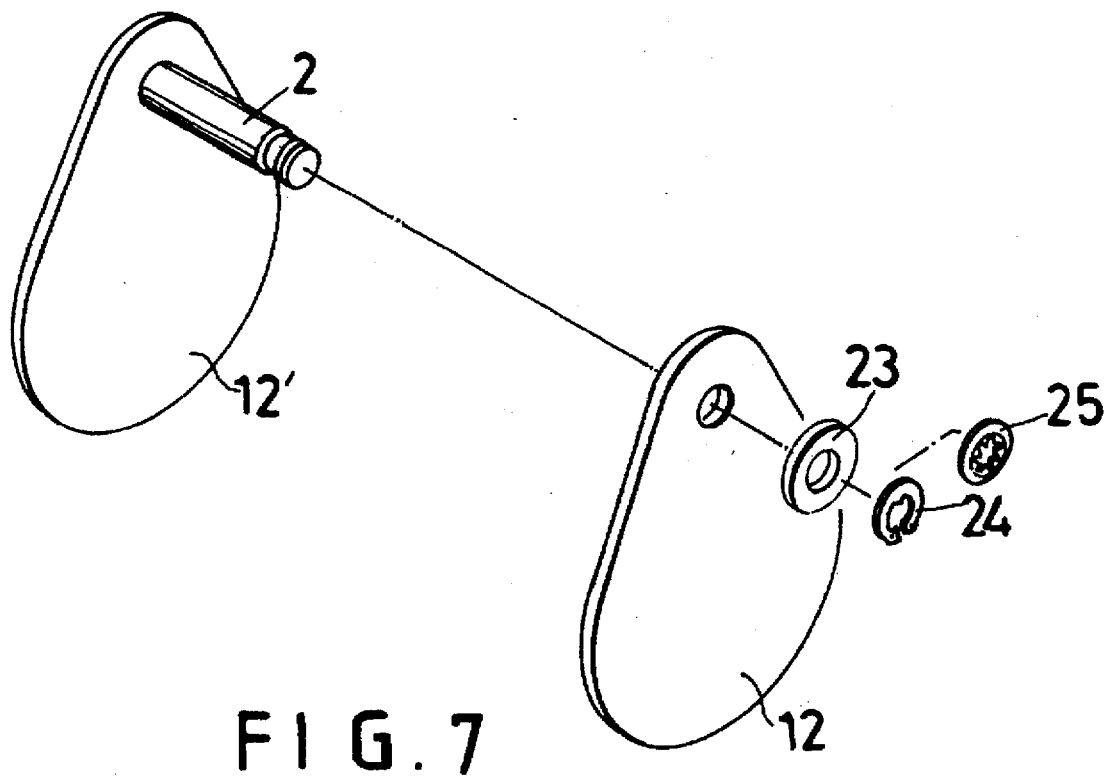
FIG. 7 is an exploded perspective view of a fourth embodiment of the earmark in the present invention.
Figure 8:
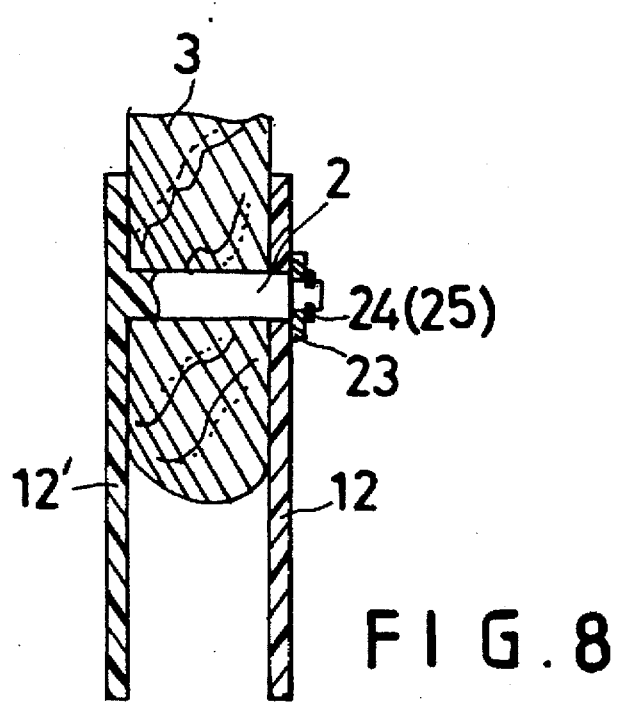
FIG. 8 is a side cross-sectional view of the fourth embodiment of the earmark in the present invention; and, FIG. 9 is a perspective view of a known conventional earmark.
Figure 9:
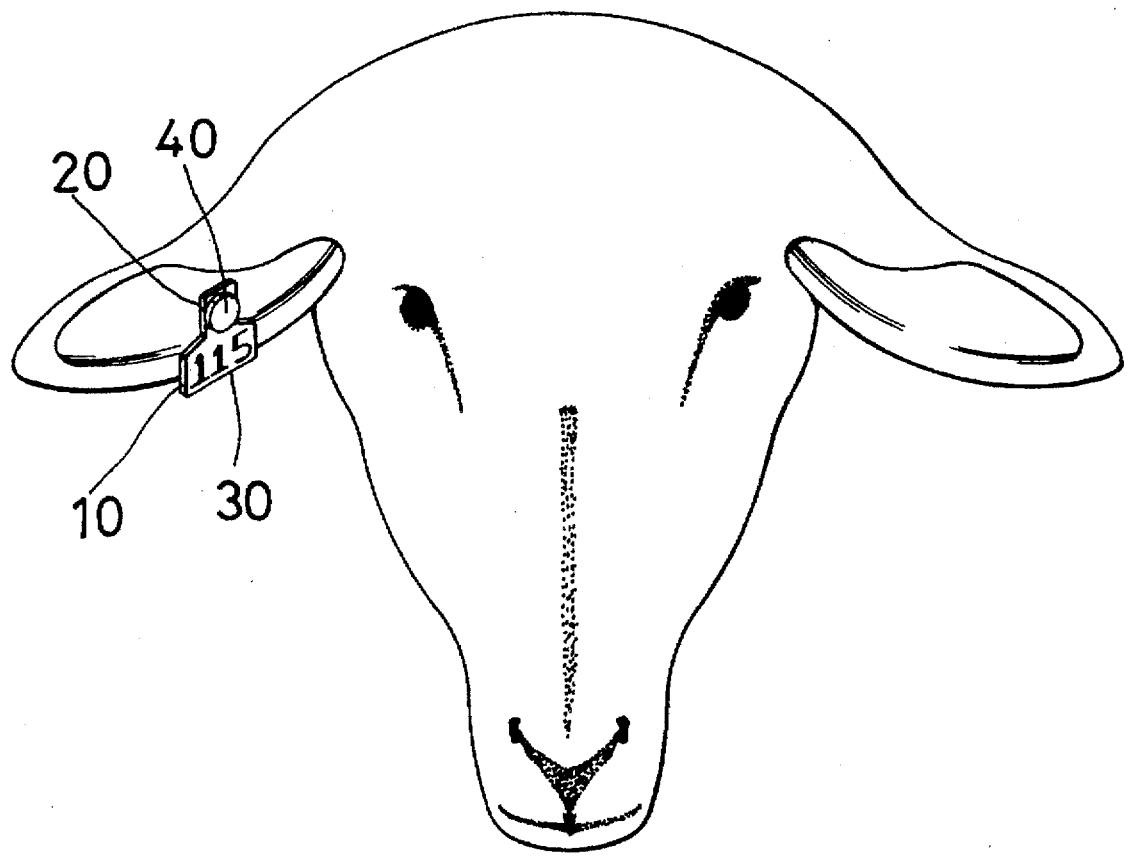

The pin 2 can be formed integrally on a right earmark 12, as shown in FIGS. 7 and 8, the right earmark 12 being fixed together with another right earmark 12' bored with a hole 122 by means of a washer 23, a lock washer 24 and a tooth lock washer 25, securing this earmark assembly 1 on an ear 3 of an animal.

Figure 3:
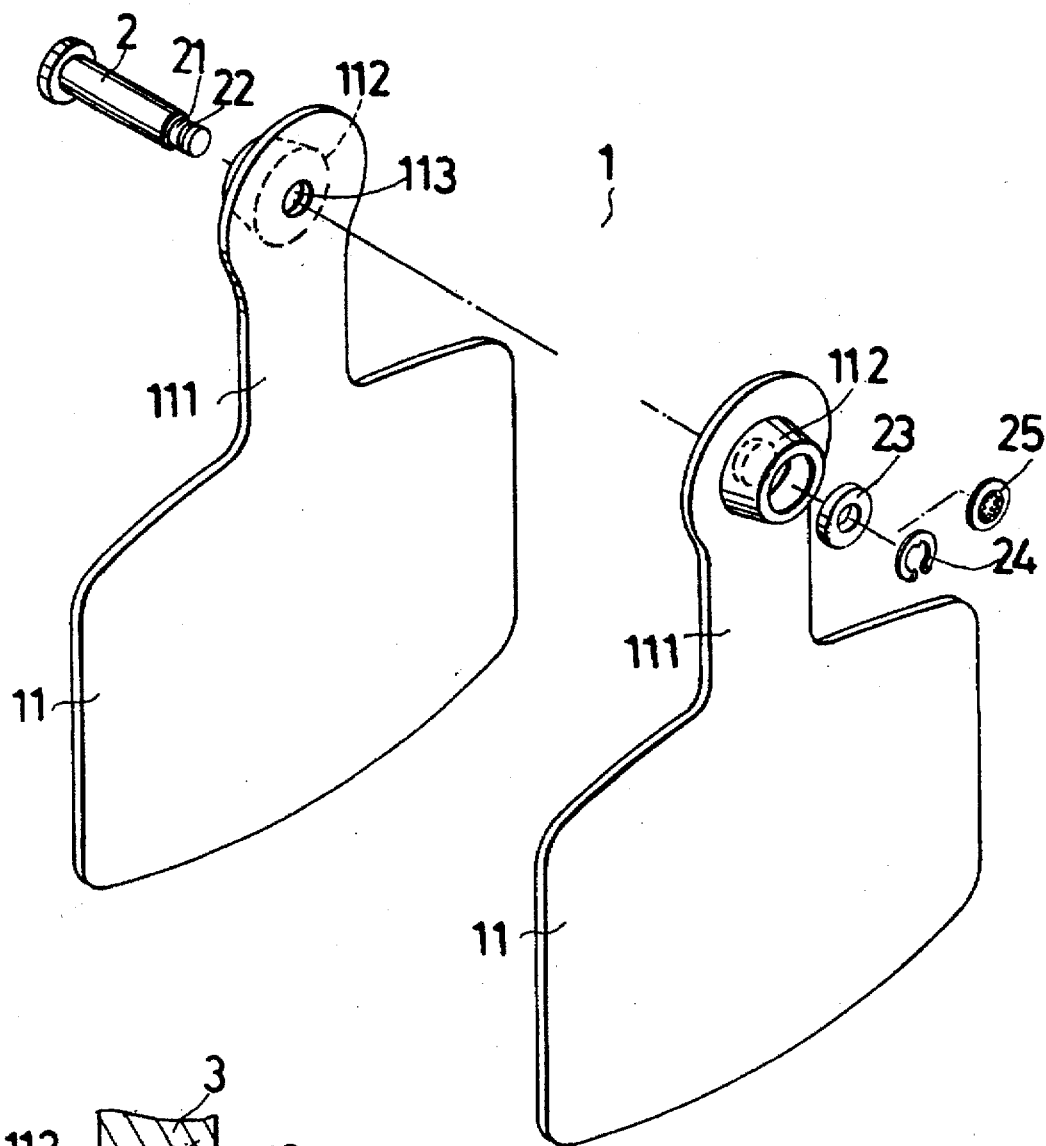
FIG. 3 is an exploded perspective view of a second embodiment of the earmark in the present invention.
Figure 4:
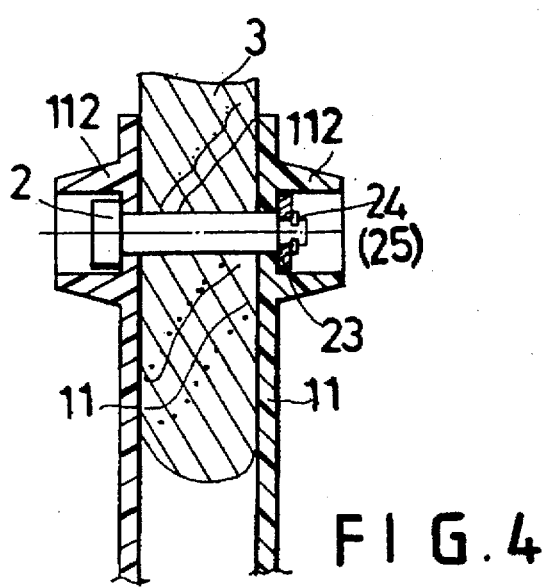
FIG. 4 is a side cross-sectional view of the second embodiment of the earmark in the present invention.

The earmark assembly 1 in the present invention may employ two left earmarks 11, 11 as shown in FIGS. 3 and 4.

A second embodiment of the present invention shown in FIG. 5 has a right earmark 12 provided with a cone-shaped projection 123 on an outer side of the upper portion, with a center hole 122 in the projection 123 having an inner surface characterized by a predetermined polygonal contour, and a bolt 4 having a thread 41 in a front end to pass through the hole 113 of the left earmark 11, an ear 3 of an animal, the hole 122 of the right earmark 12 and then engaging a nut 42 with a plastic position washer 421 so as to secure the earmark assembly 1 on the ear 3.

As can be understood from the above description, this invention has the following advantages:

1. Any component can be replaced by a new one by disengaging the lock washer or the nut, while a known conventional earmark has its components hardly taken off.
2. It can be fixed on an ear of an animal by means of a pin and a lock washer or a bolt and nut, simple to handle with a common tool.

While the preferred embodiments of the invention have been described above, it will be recognized and understood that various modifications may be made therein and the appended Claims are intended to cover all such modifications which may fall within the spirit and scope of the invention.

What is claimed is:

1. An earmark tag assembly for detachably tagging an ear of an animal comprising:

(a) first and second earmark tags adapted to substantially overly, respectively, opposing sides of at least a portion of the animal's ear, each of said earmark tags having a substantially planar inner surface facing the animal's ear and an outer surface facing away from the animal's ear on opposing sides thereof and a through opening characterized by a predetermined diameter formed therein, said first and second earmark tags each having an annular protuberance formed on said outer surface thereof disposed in spaced concentric relationship with said through opening thereof, each said protuberance forming a recessed area around a respective one of said through openings and having an outer surface with a cone-shaped contour;

(b) a fastening member releasably coupled to said first and second earmark tags, said fastening member including an axially extending shaft portion having a diameter less than said predetermined diameter of said through openings of said first and second earmark tags, said shaft portion being adapted to pass reversibly through said recessed area of said annular protuberance and said through opening of said first earmark tag, an aperture in the animal's ear, said through opening of said second earmark tag, and into said recessed area of said annular protuberance of said second earmark tag to thereby removably attach said earmark tag assembly to said animal ear, said shaft having a first end disposed within said recessed area of said first earmark tag and a second end disposed in said recessed area of said second earmark tag, said second end of said tag having a groove formed therein; and, (c) lock means releasably coupled to said groove of said second end of said fastening member shaft portion for releasably locking said coupling of said fastening member to said first and second earmark tags, said lock means being disposed within said recessed area of said second earmark tag.

2. An earmark tag assembly for detachably tagging an ear of an animal comprising:

(a) first and second earmark tags adapted to substantially overly, respectively, opposing sides of at least a portion of the animal's ear, each of said earmark tags having a substantially planar inner surface facing the animal's ear and an outer surface facing away from the animal's ear on opposing sides thereof and a through opening characterized by a predetermined diameter formed therein, said first and second earmark tags each having an annular protuberance formed on said outer surface thereof disposed in spaced concentric relationship with said through opening thereof, each said protuberance forming a recessed area around a respective one of said through openings and having an outer surface with a cone-shaped contour;

(b) a fastening member releasably coupled to said first and second earmark tags, said fastening member including an axially extending shaft portion having a diameter less than said predetermined diameter of said through openings of said first and second earmark tags, said shaft portion being adapted to pass reversibly through said recessed area of said annular protuberance and said through opening of said first earmark tag, an aperture in the animal's ear, said through opening of said second earmark tag, and into said recessed area of said annular protuberance of said second earmark tag to thereby removably attach said earmark tag assembly to said animal ear, said shaft having a first end disposed within said recessed area of said first earmark tag and a second end disposed in said recessed area of said second earmark tag, said second end of said tag having a plurality of threads formed therein; and, (c) a lock nut threadedly coupled to said plurality of threads of said second end of said fastening member shaft portion for releasably locking said coupling of said fastening member to said first and second earmark tags, at least a portion of said recessed area of said second earmark tag being defined by an inner sidewall surface having a predetermined polygonal transaxial contour for securely receiving said lock nut therein.

\* \* \* \* \*